March 13, 1928.   1,662,052

O. M. BULLOCK

AGRICULTURAL IMPLEMENT

Original Filed April 18, 1922

Inventor
ORIN M. BULLOCK

By Harry Schroeder
Attorney

Patented Mar. 13, 1928.

1,662,052

UNITED STATES PATENT OFFICE.

ORIN M. BULLOCK, OF OAKLAND, CALIFORNIA.

AGRICULTURAL IMPLEMENT.

Original application filed April 18, 1922, Serial No. 554,766. Divided and this application filed February 15, 1923, Serial No. 619,317. Renewed July 13, 1927.

My invention is an improved cultivator constructed with yieldable arms, upon which are the soil working implements, and which are sprung out of the ground by said arms whereby the soil is thoroughly broken up and finely cultivated.

In its broad aspect my invention is an improved method and appliance for cultivating soil in which a heavy body is rolled over the ground and by its, or an additional force having a downward component, drives or forces blades into the soil against the resistance of an energy storing medium, as a spring; and on the continued rolling of the body the stored energy is used to actuate the blades to loosen, turn, lift or otherwise cultivate the soil. The blades are mounted on a suitable body, which may be rolled, are connected thereto to project in advance of the body, contact with the soil in advance thereof, by the weight of the body be forced into the soil and at the same time cause the storage of energy, which on further rolling of the body is released to pull the blades through the soil and give them a lifting action to rear of the body, the blades being substantially at rest, in relation to the soil, when directly underneath the main part of the rolling body.

My invention is not to be confused, as to method and appliance, with cultivators which have resilient or resiliently mounted blades on reels or drums that are positively rotated, dragging the blades through the soil, or tending to drag them, whether these are pulled along the ground and rotate in the direction of travel, the reverse thereto or crosswise.

One object of my invention is to provide an improved construction of this type wherein a plurality of shovel blades having flanges thereon are connected as a unit by securing said flanges to a metal strip, the metal strip being in turn secured to a set of spring arms which spring arms are secured to a drum. The spring arms are normally extended away from the drum and curved in a direction away from the direction of travel of the drum, and the radius of their curvature is such that when flattened to the drum by contact with the ground, the curve of the arm follows the curved surface of the drum. There are provided a plurality of these units around the drum and they are so spaced that just sufficient clearance is provided between the flattened set of arms carrying the blades and the connection on the drum for the next adjacent set of arms.

Another object of my invention is to provide a cultivator which is simple in construction and efficient in operation.

In the drawing in which my invention is illustrated, I have shown the preferred form but it may also be embodied in other forms, and in the specification and appended claims I wish to cover my invention in whatever form it may be embodied.

This application is a division of my copending application, No. 554,766, filed April 18, 1922.

Referring to the drawing.

Figure 1:
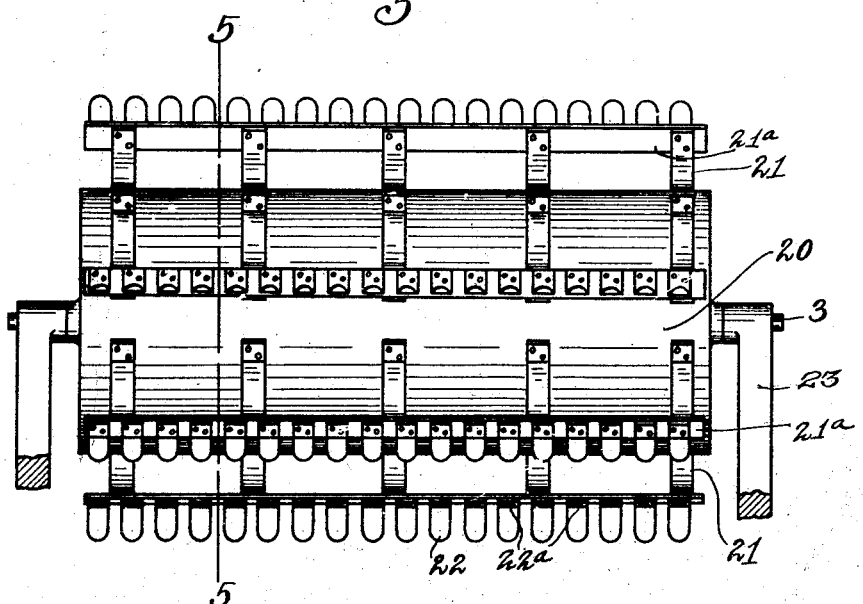
Figure 1 is a plan view of my cultivator.
Figure 2:
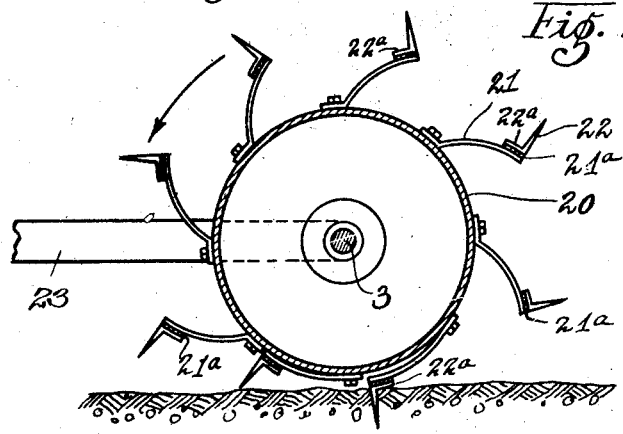
Figure 2 is a transverse sectional view taken on line 2—2 of Figure 1.

Referring more particularly to the drawing, a drum 20 is mounted on a shaft 3 which has mounted thereon the frame or shafts 23 and arcuate outwardly extending spring arms 21 are secured by screws or otherwise at one end of the periphery of said drum in longitudinal rows spaced equi-distant apart around the circumference of the drum so as to provide clearance between the flattened out arms of one set and the connections on the drum for the next adjacent set to the outer ends of which rows of arms are respectively secured a metal strip 21$^a$, to which are secured by means of flanges 22$^a$, the shovel blades 22, said blades extending outwardly at right angles to the convex side of said arms, the concaved side of said arms facing the drum and being of such curvature that they may spring upwardly against the under side of the drum when said arms are brought together with said blades into contact with the ground under the drum. When the drum rotates forwardly of the arms 21 thereunder, said arms and the blades 22 spring outwardly and rearwardly from the drum and the blades are sprung rearwardly and upwardly out of the soil with a shovel action.

It will be noted that energy or force is necessary to drive the blades into the soil, that this is derived solely from the weight of the drum and part of the frame as the drum rolls over the ground, that the blades are at rest in the soil when under the shaft 3, having no extraneous power pulling them through the soil, that the energy used in compressing the spring arms 21, when the drum rolls over them is given out in cultivating the soil as the blades are lifted.

It will be obvious that my appliance may be varied considerably to suit special circumstances, that the drum could be made in the form of a reel or with flanges holding the springs, that the spring arms and blades could be attached to tractor wheels, the track of a caterpillar tractor or the springs made stiff so that the drum will not touch the ground and other detail changes. For instance each blade could be attached to a separate spring arm. Also the spring arms could be suitably shaped by a curve and terminate in blade ends formed of the spring material.

It will be noted that the drum is rolled over the ground by means of the frame or shafts 23, being connected to the shaft 3. In the claims where I use the expression "means operatively connected to the roller member or body through which it is rolled over the ground," means the frame or shafts or their equivalent and not some power mechanism. It is an essential feature of my invention that the roller or body be rolled over the ground so that the weight of the body will force the blades on the spring arms into the soil.

Having described my invention, I claim:

1. An agricultural implement comprising a drum, a plurality of resilient arms carrying blades mounted in spaced relation about the circumference of said drum, said arms being so curved as to conform to the surface of said drum when pressed thereagainst by contact with the ground, the spacing of said arms being such that just sufficient clearance is provided between an inwardly pressed arm and the connecting means on the drum for the next adjacent arm.

2. In an agricultural implement of the character described, a rolling element, a plurality of parallel arms secured with one end to the peripheral surface thereof in spaced relation so as to extend forwardly when the element rests on the fixed ends, a transverse element connecting the free ends of the arms, and blades fixed to the transverse element so as to point toward the ground surface, when immediately approaching the same, the free ends of the arms tending to spring away from the rolling element.

3. In an agricultural implement of the character described, a rolling element, a plurality of parallel arms secured with one end to the peripheral surface thereof in spaced relation so as to extend forwardly when the element rests on the fixed ends, a transverse element connecting the free ends of the arms, and blades fixed to the transverse element so as to point toward the ground surface, when immediately approaching the same, the free ends of the arms tending to spring away from the rolling element and the blades being arranged to assume a radial position relative to the rolling element when the latter rests on the transverse element.

In testimony whereof I affix my signature.

ORIN M. BULLOCK.